METHODS OF PRODUCING SUBSTANCES OF HIGHEST PURITY, PARTICULARLY ELECTRIC SEMICONDUCTORS

Filed May 19, 1958 2 Sheets-Sheet 2

United States Patent Office 3,030,189

Patented Apr. 17, 1962

3,030,189

METHODS OF PRODUCING SUBSTANCES OF HIGHEST PURITY, PARTICULARLY ELECTRIC SEMICONDUCTORS

Hans Schweickert and Heinrich Gutsche, Erlangen, and Reimer Emeis, Pretzfeld, Germany, assignors to Siemens-Schuckertwerke Aktiengesellschaft, Berlin-Siemensstadt, Germany, a corporation of Germany Filed May 19, 1958, Ser. No. 736,387
8 Claims. (Cl. 23—223.5)

Our invention relates to a method for producing substances of extreme purity. It particularly appertains to the production of semiconducting materials such as silicon, germanium, indium arsenide, indium antimonide, gallium phosphide, and other compounds or elements which are to be used as semiconductors in rectifiers, transistors, photoelements, thermistors, and in other electric devices requiring an extremely high degree of purity of the semiconductor material.

Silicon of extremely high purity can be prepared by precipitating it from the gaseous phase, for example by reduction or thermal decomposition of suitable, preferably pre-purified, silicon compounds. Such suitable starting materials or compounds are the silicon halogenides, particularly the silicon chlorides, which are caused to react with a reaction agent such as zinc and hydrogen, for example.

When the elemental silicon resulting from these reactions is to be used to make semiconductor devices, it is preferable to precipitate it upon a carrier having the highest feasible purity.

A particular object of our invention is to improve the above process, particularly in its application to manufacture of electrical semiconductor devices.

To this end, and in accordance with a preferred form of our invention, we first prepare a semiconductor body by precipitating the substance to be produced onto a carrier of the same substance, from the gaseous phase by chemical reaction or decomposition. We then subdivide the semiconductor body thus obtained, and we use at least one of the divided parts as a carrier for a subsequent precipitation process of the same type.

The invention will be described in detail in conjunction with the drawings, in which.

Figure 1:
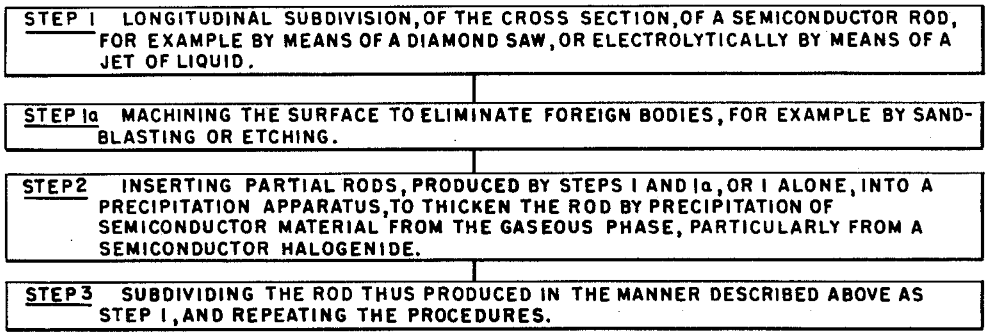
FIGS. 1 and 2 are flow diagrams summarizing several of the preferred over-all procedures employed in carrying out the invention.
Figure 2:
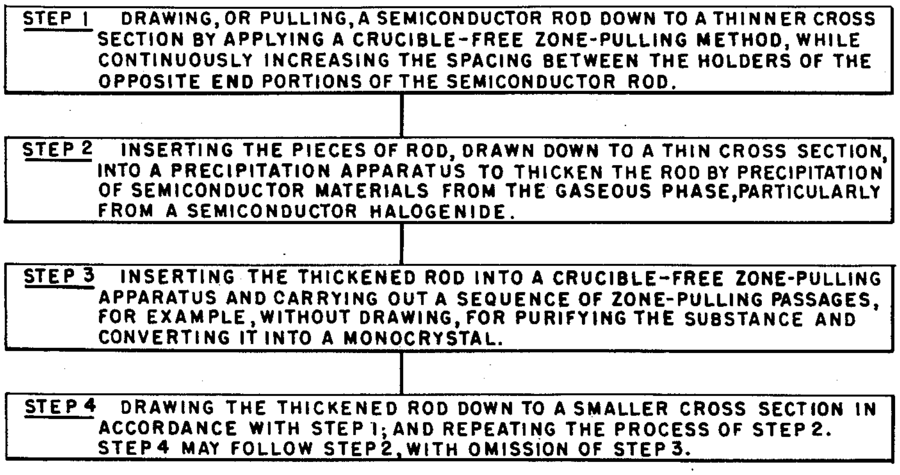

The over-all processes are summarized in the flowsheets, in FIGS. 1 and 2.

Referring to FIG. 1, the semiconductor rod, for example a silicon rod, is subdivided longitudinally by a diamond saw, or electrolytically by means of a jet of liquid. The surfaces of the resulting rods, or pieces, may be machined to eliminate foreign bodies, or they may be sand-blasted or etched. Two of the rods so produced by subdivision are then mounted in a chamber, as in FIG. 3, and are connected to conduct electric current serially therethrough. If the rods are of silicon, a gas mixture of hydrogen and silicon tetrachloride or of silicon hydrogen trichloride vapor is introduced through a high velocity nozzle between the rods, which are heated by the current to glowing temperature. The rods become thickened by precipitation of semiconductor material, viz. silicon, from the gaseous phase. The rod is then subdivided longitudinally in the manner described above, and the multiple rods so produced subjected to the procedures described above, for eliminating foreign bodies and for thickening in said chamber.

FIG. 2 illustrates a number of other procedures. A semiconductor rod, such as silicon, is first drawn down to a thinner cross section by a crucible-free zone pulling and drawing process. For example, the opposite ends of a vertical silicon rod are continuously moved in opposite directions, by means of spaced holders, while a radiative or electro-inductive heating element (see element 10 of FIG. 7) is moved along the rod, preferably out of contact with the rod. Only a limited zone is heated. Consequently, a small molten globule of semiconductor is formed at the restricted heating zone. The molten zone travels along the rod. The pieces of silicon rod, so drawn own to a narrow cross-section are placed in the decomposition chamber, as described above, to thicken them by deposition of silicon thereon, by decomposition of a silicon halide gas. The thickened rod may then again be subjected to crucible-free zone pulling passages, repetitiously, to purify the silicon, and also with seeding by a monoseed crystal, to produce a large monocrystalline rod. This step can be carried out without drawing, so that the rod remains thick. In the next step the thickened rod is drawn down to a smaller cross-section by the above-described crucible-free zone drawing process.

FIGS. 3 to 6 illustrate a process and method for decomposing a gaseous compound of the semiconductor upon a heated rod of the same material.

In the embodiment illustrated in FIGS. 3 to 6 the carrier rods extend upwardly from the supporting base. A substantially vertical, or sharply inclined, arrangement of the rods has been found particularly favorable with respect to the design and use of the equipment. However, the method can also be carried out with the rods arranged in a horizontal or a less sharply inclined position. Similar components are denoted by the same respective reference characters in both groups of illustrations.

Figures 3, 4, 5, 6:
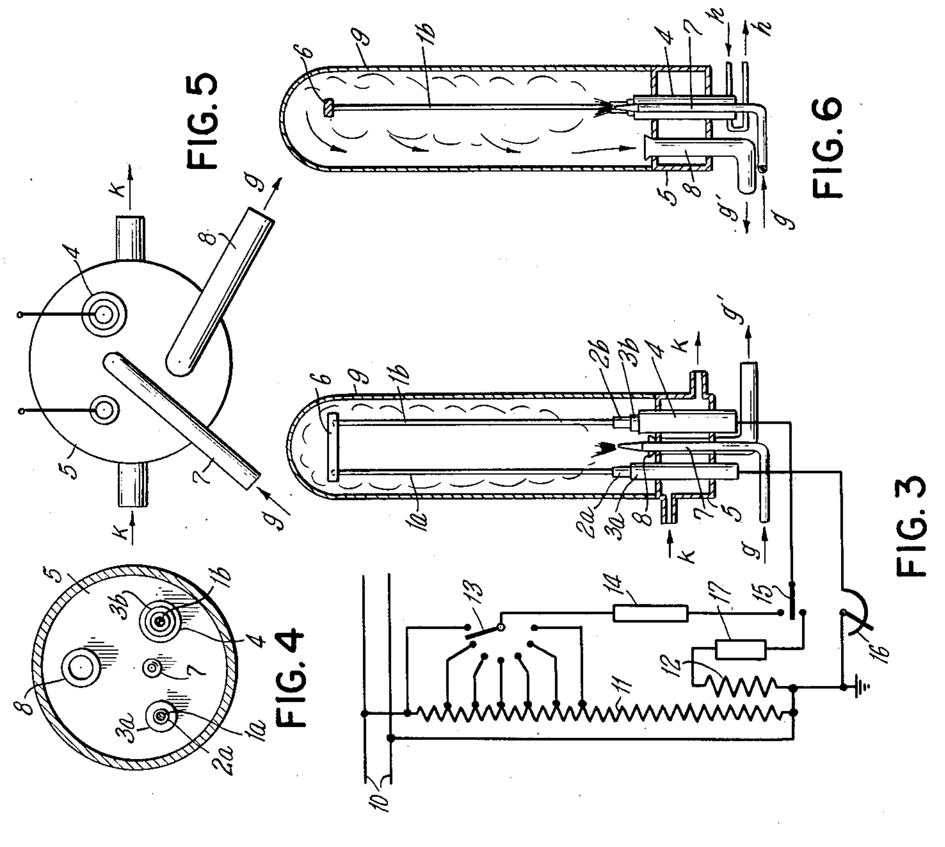
FIG. 3 is a vertical, partly sectional view of an apparatus for decomposing a gas comprising a compound of the semiconductor material in contact with a heated rod, or filament of the same material.
FIG. 4 is a horizontal section of FIG. 3.
FIG. 5 is a bottom view of FIG. 3.
FIG. 6 is a partly sectional side view of the device of FIG. 3.

In FIG. 3 two thin silicon rods are denoted by 1*a* and 1*b*. They can be obtained, for example, from a thicker silicon rod which was previously produced by the same method, by subdividing the rod either with the aid of a diamond saw or by drawing the rod to a thinner cross-section and breaking it to suitable length. The rods 1*a* and 1*b* may have a length of 0.5 m. and a diameter of 3 mm. Such rods remain self-supporting even in incandescent condition, such as at a temperature of 1100 to 1200° C. The lower ends of the silicon rods 1*a* and 1*b* are inserted into respective holders 2*a* and 2*b* preferably consisting of graphite of highest purity, particularly the so-called "spectral carbon." Spectral carbon is obtainable in commerce in the form of rods of circular cross-section and is normally used as electrodes for producing an arc for spectral analyses. Short pieces of such spectral carbon are provided at one front face with a slightly conical bore into which the end of a silicon rod can be pushed to firmly seat the rod in the holder. The holders may also be designed as clamps. For this purpose the graphite rod at its bored end may be split in half over a suitable axial length, one half remaining firmly joined with the body of the graphite rod whereas the other is severed from the rod by means of an incision perpendicular to the rod axis. The two halves, namely the fixed half and the loose half, form respective clamping jaws which are held together by a graphite ring, after the end of the silicon rod has been clamped between them.

Graphite holders 2a and 2b are pushed, in part, into metal pipes 3a and 3b, being firmly seated therein. The metal pipes are gas-tightly sealed in a common base structure 5, which may likewise consist of metal and is preferably made hollow, and is provided with stub pipes for the supply and discharge of a coolant such as water. The flow of coolant is indicated by arrows *k*. The metal pipe 3a may be directly soldered to the metallic base structure 5. This requires the insulating of the other metal pipe 3b by means of a sleeve 4 of electrically non-conducting material relative to the metallic base structure 5. The insulating sleeve 4 may consist, for example, of glass, porcelain or other ceramics, or of plastics. The metal pipes 3a and 3b must be gas-tightly sealed by a transverse wall or by a stopper, somewhere within the interior of the pipes, or at their lower end.

The silicon rods 1a and 1b may also be directly clamped in the respective metal pipes 3a and 3b, thus eliminating the carbon clamps or holders 2a and 2b. This, however, requires giving the silicon rod at the clamping ends a larger cross-section than elsewhere, so that these clamping locations are not as strongly heated during the heat processing as the thinner rod portions.

The carrier rods 1a and 1b extend parallel to each other so that their free ends do not touch. These ends are conductively connected with each other by a bridge 6 of high-purity graphite. This bridge 6 also consists preferably of spectral carbon. It may be provided with bores engaging the upper ends of the respective rods 1a and 1b.

The base structure 5 also accommodates an inlet pipe 7 for the gaseous reaction mixture from which the semiconductor material is precipitated. The upper end of the inlet tubes 7 is nozzle shaped, and causes the fresh gas mixture to enter into the reaction space in turbulent flow as a free jet. During the precipitating process the nozzle must not be heated up to the reaction temperature. This is necessary in order to prevent the reaction from taking place within the nozzle, which would have the result that silicon deposited at the inner nozzle walls would narrow, or even clog, the nozzle opening. The tip of the nozzle is therefore mounted below the upper ends of the carbon holders 2a and 2b. The jet of gas travels from the fastening points of the carrier rods in the longitudinal direction of the rods. The inlet pressure of the fresh gas mixture can be so adjusted that the rods 1a and 1b are flooded with fresh gas along their entire length. The gas leads through an outlet tube 8 which is likewise inserted into the base structure 5 and is gas-tightly sealed relative thereto. The gas inlet and the gas outlet are identified in FIG. 5 by arrows *g*. A transparent bell 9 of glass or quartz is gas-tightly sealed and fastened on the base structure 5, and encloses the reaction space.

The electric leads for supplying the heating current are connected to the metal pipes 3a and 3b. Since the silicon rods 1a and 1b have a very high electric resistance when cold, amounting to a multiple of the resistance in incandescent condition, there are preferably provided two sources of heating current. One is for high voltage to produce heating at low current intensity. The second is a source of low voltage for continuous operation at high current intensity during the depositing process proper. Accordingly, FIG. 3 shows a high-voltage line 10 to which the primary winding 11 of a transformer is connected. A controllable voltage can be taken from the primary winding 11 by means of taps and a selector switch 13. The tapped-off voltage can be controllably applied to the metal tube 3b, during the heating-up period, by means of the selector switch 13 which is in series with a stabilizing impedance 14 and a switch 15. The metal pipe 3a is connected through a control rheostat 16 with the grounded end of the transformer winding 11. During the heating-up period the voltage can be varied by means of the selector switch 13 in such manner that the heating current does not become larger than two amperes. When the silicon rods have reached glowing red condition, the voltage is reduced by means of switch 13 so that the switch 15 can be switched over to supply voltage from the secondary transformer winding 12, which is rated for low voltage and high current intensity. For stabilization, the low-voltage circuit of winding 12 is provided with an impedance 17. By means of the control rheostat 16 the current is increased until the silicon rods 1a and 1b have reached a temperature of about 1150° C., which has been found to be most favorable for the performance and economy of the process. The temperature is indicated by the glowing color of the rods and is kept constant for the duration of the process. This requires a continuous and gradual increase of the current, regulated by means of rheostat 16, due to the fact that the resistance of the rods decreases with increasing thickness.

The arrangement of the rod holders, the gas inlet and the gas outlet are apparent from FIG. 4. The path of the gas flow within the reaction space is schematically indicated in FIG. 4 by curved arrows. Also shown in FIG. 6, and denoted by arrows *h*, is a coolant circulation for the insulated metal pipe 3b. The interior of pipe 3b is traversed by a flow of coolant, water for example, which passes through insulating tubing, comprising glass tubes and hoses of insulating material. The insulation of the coolant circulation system must either by sufficient for the high voltage used during the heating-up period, or care must be taken that the coolant circulation system is inactive during the heating-up period and safety devices provided so that it can be made active only during continuous processing with low voltage.

Instead of providing a single pair of rods, any desired larger number of rods, even or odd, may be arranged within a single reaction space. While in the illustrated example the electric heating current passes serially through the two rods, any desired number of rods may be connected in parallel to a single pole of the heating circuit, and the numbers of rods thus parallel connected to a single pole may differ from the number of rods connected to the other pole. Depending upon the number of rods to be processed simultaneously, the bridge member 6 may have lateral arms or may be given a cross- or star-shaped design, preferably so disposed that the ends touch the walls of the bell 9 in order to brace the upper rod ends in lateral direction.

As indicated above, when germanium or other material is to be precipitated, the silicon rods can be replaced by rods of germanium or such other material. To produce germanium of highest purity, there may be used, for example, germanium tetrachloride ($GeCl_4$) in gaseous condition as a starting substance, employing hydrogen as carrier gas and reduction agent. In this case the reaction temperature is preferably in the range between 700 and 800° C.

It is further understood that the gaseous mixture employed may be a mixture of hydrogen and silicon tetrachloride or silico-chloroform when silicon is being precipitated, or any other gas or gaseous mixture capable of reaction or decomposition to produce silicon.

It is further understood that the gas or gaseous mixture employed when germanium is being precipitated is any gas or gaseous mixture capable of reacting or decomposing to precipitate germanium.

Another example is the production of silicon carbide (SiC) from monomethyltrichlorsilane ($CH_3SiCl_3$), employing hydrogen as carrier gas and reducing agent. In this case the reaction temperature is preferably between 1300° and 1400° C. approximately. A carrier rod of silicon carbide is used in the latter case, produced from a thicker rod by sawing it parallel to the rod axis. At the higher melting temperature of silicon carbide there occurs a dissociation into the components, the silicon being evaporated out of the material. However, the carrier rod may also consist of pure carbon. This carbon core can later be removed by mechanical means, if necessary. Also suitable as starting materials for the production of silicon carbide are mixtures of silcon-halogen compounds with hydrocarbons, an addition of hydrogen gas being employed as carrier gas and reducing agent. As examples, we employ the mixtures:

$$(SiCl_3H+C_6H_{12})+H_2$$

or $$(SiCl_3H+CCl_3H)+H_2$$

The most favorable reaction temperatures are between the approximate limits of 1300 and 1400° C.

Essential for the economy of the method is the proper choice of the molar ratio MV, which is defined as the number of moles of the compound containing the semiconductor substance, with respect to the number of moles of the hydrogen being used. This molar ratio is to be chosen differently for different mixtures of substances. When producing silicon from $SiCl_3H$, this ratio is between 0.015 and 0.3, preferably between 0.03 and 0.15.

If these limits are observed, an excessive hydrogen consumption on the one hand, and an excessive consumption of $SiCl_3H$ on the other hand, are avoided. Within the abovementioned narrower range, there is achieved a yield of silicon between 40% and 20%, calculated in relation to the total quantity of silicon contained in the starting substances.

When producing silicon from $SiCl_4$, the molar ratios are preferably chosen between 0.01 and 0.2, with particular perference to the range between 0.015 and 0.10. In this medium range a production of silicon between about 30% and about 8% is obtainable.

For the production of germanium from $GeCl_4$, the molar ratio is advantageously chosen in the range between 0.1 and 0.4, preferably approximately 0.2. In this case a production of germanium up to 90° is obtainable.

As indicated above, a rod produced by the above-described precipitation from the gaseous phase may be sawed, in the longitudinal direction, into several carrier rods each having a smaller cross-section. The axial cutting planes may extend in angular relation to each other. They may extend crosswise or angularly through the geometric axis of the original rod. This is particularly advantageous when this step is carried out for the first time, especially when the initial rod to be employed was produced with the aid of a carrier made according to the electric-arc method. By cutting this carrier rod after the manner of a cross cut through or along the lengthwise geometric axis, the original carrier is reduced to chips, to a large extent. The resulting irregular residue of the original carrier is then located at the surface of the new carrier rods, of smaller cross-section, and hence can be eliminated by additional machining.

Another way of reducing the original rod to partial rods, for further processing, is to carry out a number of parallel cuts through the original rod, to sever a number of bands of strips from the original rod, these strips being used as carriers for subsequent precipitation processes. Such parallel cuts can be made by means of a plurality of saw blades all operating simultaneously during a single pass of the cutting operation. As indicated above, subdivision of the original rod may also be effected electrolytically with the aid of a jet or beam of liquid, such as 10% sodium lye at about 50–90° C. Jet electrolytic etching techniques for germanium are disclosed in proceedings of the I.R.E. December 1953, pages 1706–1707.

After subdivision, the several parts obtained are preferably subjected to surface cleaning by mechanical means, for instance by sand blasting, or to chemical cleaning by etching.

As already mentioned, the desired reduction in cross-section of the original rod may be effected by stretching the original rod-shaped body with the aid of a crucible-free zone melting and pulling method, in which the two ends of a rod are moved away from each other during processing. In order to keep the length of the apparatus within desired limits or to permit using a pulling device of the type required for further semiconductor processing, it is further preferable to draw only a portion of the entire length of the original rod down to a thinner cross-section, and to then sever the portion of reduced cross-section, before using it for a subsequent precipitation or deposition process.

Figure 7:
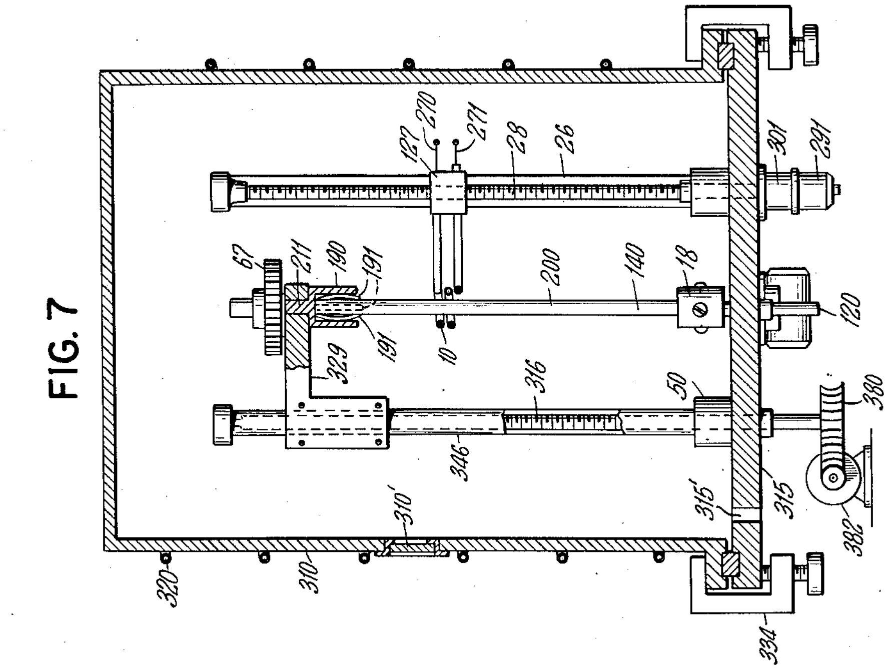
FIG. 7 is a diagrammatic vertical section of an apparatus employed to carry out a crucible-free zone melting procedure, to either purify by zone melting or to draw or pull the semiconductor rod to produce a rod of smaller cross section, or to do both simultaneously.

FIG. 7 illustrates an apparatus suitable for carrying out the zone-melting purification, monocrystal formation, and drawing procedure or procedures. The apparatus and the procedures are analogous to those described in Reimer Emeis applications Serial No. 727,610, filed April 10, 1958, now U.S. 2,911,432, and Serial No. 409,610, filed February 11, 1954. As disclosed in these applications, donor or acceptor substances can also be incorporated, to obtain n-type and p-type of conduction. Application of a high vacuum is advantageous.

In FIG. 7, a rod 200, of silicon, germanium, or $A_{III}B_V$ semiconductor compound, is supported vertically in a large diametered steel dome 310, by means of upper aluminum oxide holder 190 and lower holder 18. After attaching a seed, single crystal 14, the high frequency induction coil is moved adjacent the upper molybdenum auxiliary heating strips 191, in which heat is developed to cause glowing of the upper end of rod 200. This starts the process of inducing heating current in the rod 200, which is insufficiently electro-conductive when cool. coil 10 is carried on slider 27 which moves along spindle 28 mounted by upright 26. Leads 270, 271 are connected to a high frequency current source (not shown). Motor 291 turns spindle 28 through gear box 301. Lower shaft 20 of holder 18 and upper shaft 211 of holder 190 are individually turnable about the axis of rod 200. Upper holder 190 is turned by gear 67 and is also movable upwardly, by means of bracket 329 on slider 318, which moves along spindle 316 mounted on upright 346. Spindle 316 is turned by motor 382 through gear 380. Base plate 315 is apertured at 315' for application of high vacuum and the dome 310 is secured thereon by clamp 334. Dome 310 is cooled by water coils 320 and is provided with an observation window at 310'. The molten zone can be caused to move upwardly through and from the seeded location 140 while the lower seeded location is rotated at about 20 to 120 revolutions per minute, depending upon the rod diameter and length. The rotation of the upper end is not essential at this stage.

The above-described processes are particularly advantageous when applied to silicon. The method, however, is also applicable to other semiconductor substances which are required in extreme purity, and are preferred in monocrystalline form, for example in the manufacture of electric semiconductor devices such as rectifiers, transistors, photocells and the like. The method is suited to the production of highly purified germanium, and semiconducing compounds of two elements from the third and fifth groups of the periodic system, such as DN, BP, BAs, BSb, AlN, AlP, AlAs, AlSb, GaN, GaP, GaAs, GaSb, InN, InP, InAs, and InSb. The process is also utilizable for the production of other meltable substances, particularly metals and metal compounds having a high melting point.

It will be obvious to those skilled in the art, upon a study of this disclosure, that processing devices according to the invention can be modified in various ways and may be embodied in equipment other than that illustrated and described herein, without departing from the essential features of our invention and within the scope of the claims annexed hereto.

We claim:

1. A method of producing an electric semiconductor of high purity, comprising contacting the peripheral surface of a carrier body of the same material as the semiconductor with a gas comprising a chemical compound of the material, the carrier body having opposite ends and a peripherally extending surface and being heated by passing an electric current through the body longitudinally of said peripherally extending surface, the heating being to a temperature sufficiently high to cause chemical conversion of the chemical compound to said material and deposition of the latter on the peripheral surface of the carrier body, longitudinally subdividing the resulting enlarged body into pieces, and contacting the longitudinally extending peripheral surface of at least one of said pieces, employed as heated carrier body as aforesaid, with a gaseous chemical compound of the said material to enlarge said piece by deposition of the material thereon.

2. A method of producing a silicon electric semiconductor, comprising contacting the peripheral surface of a carrier body of silicon with a gas mixture comprising a silicon halogenide and a reducing agent, the carrier body having opposite ends and a peripherally extending surface and being heated by passing an electric current through the body longitudinally of said peripherally extending surface, the heating being to a temperature sufficiently high to cause conversion of the silicon halogenide to silicon and deposition of the latter on peripheral surface of the carrier body, longitudinally subdividing the resulting enlarged silicon body into pieces, and contacting the peripheral surface of at least one of said pieces, employed as heated carrier body as aforesaid, with a gas mixture of silicon halogenide and a reducing agent to enlarge said piece by deposition of the silicon produced thereon.

3. A method of producing a silicon electric semiconductor, comprising contacting the peripheral surface of a carrier body of silicon with a gas mixture comprising silicon tetrachloride and hydrogen, the carrier body having opposite ends and a peripherally extending surface and being heated by passing an electric current through the body longitudinally of said peripherally extending surface, the heating being to a temperature sufficiently high to cause conversion of the silicon tetrachloride to silicon and deposition of the latter on the peripheral surface of the carrier body, subdividing the resulting enlarged silicon body longitudinally of the peripheral surface into pieces, and contacting the peripheral surface of at least one of said pieces, employed as heated carrier body as aforesaid, with a gas mixture of silicon tetrachloride and hydrogen to enlarge said piece by deposition of the silicon produced thereon.

4. A method of producing a silicon electric semiconductor, comprising contacting the peripheral surface of a carrier body of silicon with a gas mixture comprising a silicon hydrogen trichloride and hydrogen, the carrier body having opposite ends and a peripherally extending surface and being heated by passing an electric current through the body longitudinally of said peripherally extending surface, the heating being to a temperature sufficiently high to cause conversion of the silicon hydrogen trichloride to silicon and deposition of the latter on the peripheral surface of the carrier body, subdividing the resulting enlarged silicon body longitudinally of the peripheral surface into pieces, and contacting the peripheral surface of at least one of said pieces, employed as heated carrier body as aforesaid, with a gas mixture of silicon hydrogen trichloride and hydrogen to enlarge said piece by deposition of the silicon produced thereon.

5. A method of producing an electric semiconductor of high purity, comprising contacting the peripheral surface of an elongated carrier body of the same material as the semiconductor with a gas comprising a chemical compound of the material, the carrier body being heated by passing an electric current through the elongated body lengthwise thereof, the heating being to a temperature sufficiently high to cause chemical conversion of the chemical compound to said material and deposition of the latter on the lengthwise extending peripheral surface of the carrier body, stretching the enlarged body, in a crucible-free zone-pulling process, by pulling an end region thereof in a direction away from the opposite end region while melting a zone of limited longitudinal dimension by heating means having no contact with said zone, the molten zone being caused to be displaced longitudinally with respect to the body during the pulling, whereby an elongated section of reduced cross-section is produced in the body, contacting at least part of the reduced section, employed as heated elongated carrier body, with a gaseous chemical compound of the said material to enlarge said piece by deposition of the material thereon.

6. A method of producing a silicon electric semiconductor of high purity, comprising contacting the peripheral surface of a carrier body of the silicon with a gas comprising a chemical compound of the material, the carrier body having opposite ends and a peripherally extending surface and being heated by passing an electric current through the silicon body longitudinally of the peripheral surface, the heating being to a temperature sufficiently high to cause chemical conversion of the chemical compound to said material and deposition of the latter on the peripheral surface of the carrier body, subdividing the resulting enlarged body longitudinally of said surface into pieces, cleaning the peripheral surface of at least one of the pieces, surface semiconductor material being also removed in the cleaning, contacting the peripheral surface of the cleaned piece, employed as heated carrier body as aforesaid, with a gaseous chemical compound of the said material to enlarge said piece by deposition of the material thereon.

7. A method of producing a silicon electric semiconductor of high purity, comprising contacting the peripheral surface of an elongated carrier body of silicon with a gas comprising a chemical compound of the material, the carrier body being heated by passing an electric current through the elongated body lengthwise thereof, the heating being to a temperature sufficiently high to cause chemical conversion of the chemical compound to silicon and deposition of the latter on the peripheral surface of the carrier body, purifying and stretching the enlarged body, in a crucible-free zone purifying and pulling procedure, end regions thereof being relatively displaced in opposite directions while melting a zone of limited longitudinal dimension by heating means having no contact with said zone, the molten zone being caused to be displaced longitudinally, and relatively, with respect to the body during the purifying and the pulling, the pulling producing a reduced section in the body, contacting the peripheral surface of at least part to the reduced section, employed as heated carrier body, with a gaseous chemical compound of silicon to enlarge said piece by deposition of silicon thereon.

8. A process of making a silicon electric semiconductor of high purity, comprising the step one of pulling a silicon semiconductor rod to form a length of smaller cross-section in a crucible-free zone pulling process, in which opposite end regions of the silicon rod are held and relatively displaced longitudinally away from each other while melting a zone of limited longitudinal dimension by heating means having no contact with the molten zone, the molten zone being caused to be relatively displaced longitudinally with respect to the rod during the relative displacement of the end regions, and the step two of passing an electrical heating current lengthwise through the pulled silicon rod and passing a gas comprising a silicon halogenide in contact with the peripheral surface of the hot rod while the electric heating current is passed through the rod, to decompose the halogenide to deposit silicon on the peripheral surface of the rod, and the subsequent procedure of purifying the thus thickened silicon rod by a crucible-free zone melting process, and of drawing the thickened rod down to a smaller cross-section in a crucible-free zone pulling process, and thereafter subjecting the silicon rod of smaller cross-section to step two.

References Cited in the file of this patent

UNITED STATES PATENTS

| | | |
|---|---|---|
| 1,601,931 | Van Arkel | Oct. 5, 1926 |
| 2,438,892 | Becker | Apr. 6, 1948 |
| 2,763,581 | Freedman | Sept. 18, 1956 |
| 2,768,074 | Stauffer | Oct. 23, 1956 |
| 2,793,103 | Emeis | May 21, 1957 |
| 2,825,108 | Pond | Mar. 4, 1958 |
| 2,854,318 | Rummel | Sept. 30, 1958 |

FOREIGN PATENTS

| | | |
|---|---|---|
| 745,698 | Great Britain | Feb. 29, 1956 |

OTHER REFERENCES

Tiley et al., in Proceedings of the I.R.E., December 1953, pages 1706–1707.

Keck et al.: "The Review of Scientific Instruments," vol. 25, No. 4, pages 331–334, April 1954.